May 29, 1945. S. M. KASS 2,377,240
INSIDE CALIPER
Filed June 12, 1943
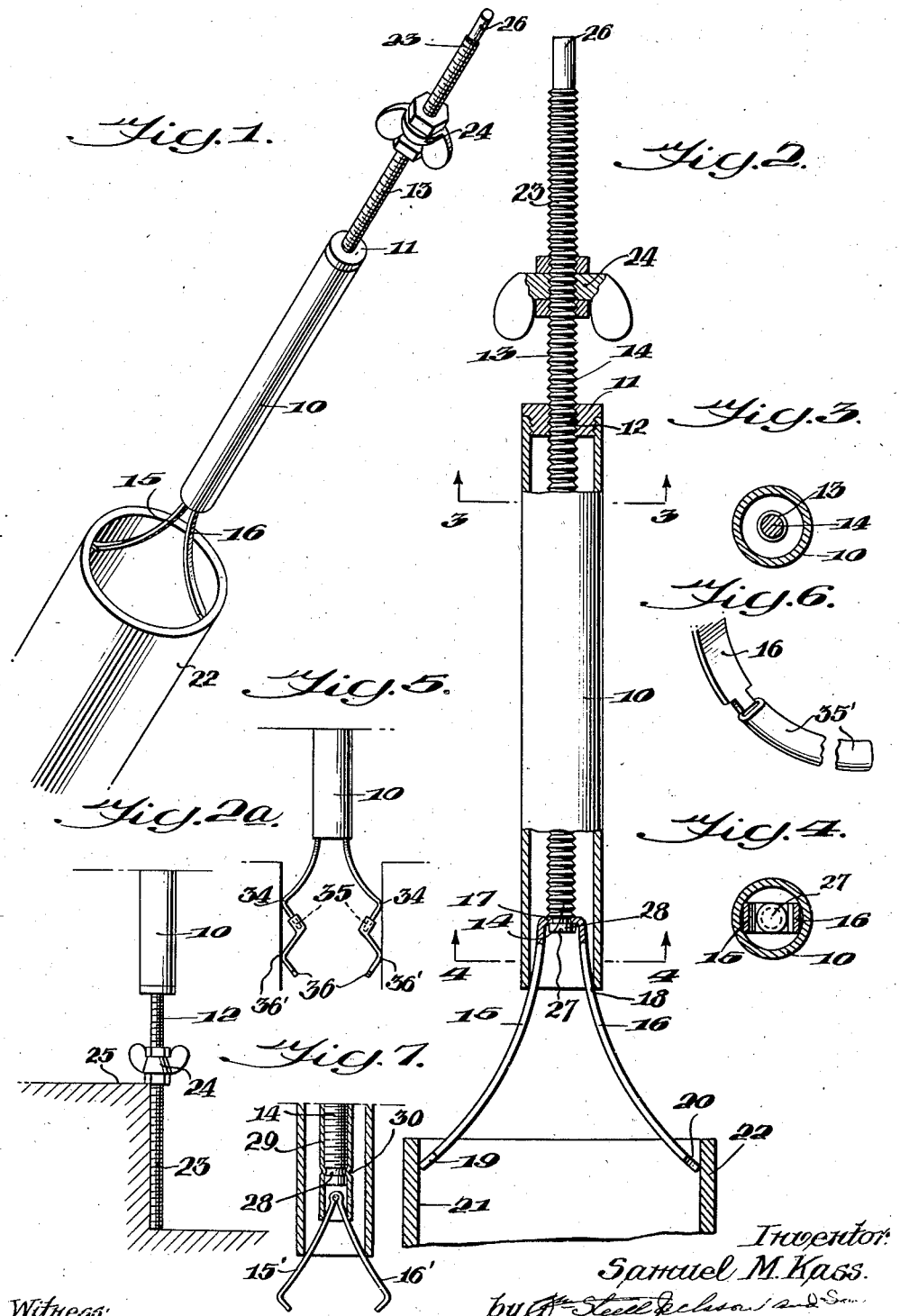
Inventor:
Samuel M. Kass.

Patented May 29, 1945

2,377,240

UNITED STATES PATENT OFFICE 2,377,240

INSIDE CALIPER

Samuel M. Kass, Philadelphia, Pa.

Application June 12, 1943, Serial No. 490,553

3 Claims. (Cl. 33—156)

My invention relates to devices of the gauge type which measure the distances between opposite sides of openings, much as inside calipers measure them, and act as a depth gauge.

One purpose of my invention is to use longitudinal movement of the measuring elements to vary the radial measurements of the calipering gauge.

A further purpose is to draw diverging spring fingers within an opening as a means of varying the divergence of feeler ends of the fingers and of holding them in a set position.

A further purpose is to facilitate the insertion of an inside gauge caliper within an opening which is to be measured.

A further purpose is to increase the extent of reach by adding calipering terminals which act as extensions.

A further purpose is to pull diverging spring inside caliper fingers within a controlling orifice by tension means and thereby to bring their measuring points closer together.

A further purpose is to use a threaded end of an inside calipering unit as a depth gauge by threading a nut on it to different extents.

Further purposes will appear in the specifications and in the claims.

I prefer to illustrate one form only among the various forms in which the invention might appear, selecting a form which is practical, effective and inexpensive but which has been selected primarily because it well illustrates the purposes of the invention.

Figure 1 is a perspective view of the preferred form of my invention as it appears in use as an inside caliper.

Figure 2 is a longitudinal section to enlarged scale of the structure seen in Figure 1.

Figure 2ª is a side elevation showing the structure at the rear of the caliper used as a depth gauge.

Figures 3 and 4 are sections from lines 3—3 and 4—4 respectively of Figure 2 looking in the direction of the arrows.

Figure 5 is a fragmentary section of the type of structure seen in Figure 2 with double extension fingers for calipering use.

Figure 6 is a fragmentary perspective of a structure such as that in Figure 2 using supplemental fingers for extension purposes.

Figure 7 is a fragmentary longitudinal section showing a modification.

In the drawing similar numerals indicate like parts.

The sleeve or tube 10 acts as a handle. Initially it may be open at both ends. It is closed at the rear end by a plug (nut) 11 rigidly fastened to the tube and internally threaded at 12. It receives the thread 13 upon an operating rod 14. The rod 14 passes through a part of the length of the sleeve or tube. Near the front end of the sleeve or tube a pair of diverging spring arms 15 and 16 is swiveled to the rod at 17. The spring of the material forming the arms spreads them against the inner walls 18 at the mouth of the tube. In the illustration the band forming the spring is continuous and extends past the swiveling socket 17 inside the open front end of the tube. The rod extends at the back and can be turned to pull the arms in or to push them out.

The arms 15 and 16 terminate in feeler fingers 19 and 20 which are intended to perform interior calipering functions in the calipering of the interior surface 21 within work 22 which is to be measured.

When the rod is turned to cause it to move bodily to the rear, the feeler finger ends approach each other so that the distance from the outer end of one feeler finger to the outer end of the other is reduced. Likewise turning the rod in the opposite direction spreads the ends of the fingers.

As thus far described the tube affords a handle by which the device can be held while the fingers are adjusted and, subsequently, while the measurements are taken.

Since the rear end of the rod 14 must pass through the nut 11 so as to be accessible for adjustment to be made, it is passed through to an additional extent so as to provide a depending rod 23 which can be used as a depth gauge in connection with a supplemental nut 24, to measure depths, as from a shelf or shoulder 25 as seen in use in Figure 2ª.

For convenience in depth gauge use the thread of the rod is not carried to the end of the measuring rod. This is seen at 26.

The swiveling connection between the adjusting rod and arms 15 and 16 is shown differently in Figures 2 and 7. In Figure 2 the rod 14 terminates in a head 27 spaced from the rod to provide a neck 28. The continuous spring which forms arm 15 at one end and arm 16 at the other end is apertured at the middle so as to pass over an initially straight portion in line with the neck 28 during the formation of the connection and the straight portion is then riveted to form the head 27 and keep the spring in place while permitting swivel action.

In Figure 7 the end of the rod 14 is necked at 17 as in the case of Figure 2 but the neck is used for a slightly different purpose. A ferrule or nipple 29 is passed over the outer end of the rod 14 and is spun into the neck at 30 so that the swiveling action takes place between the rod and the ferrule or nipple 29. The spring metal from which the arms are made is then bent to form an eye 31 and the eye is held in place within the ferrule or nipple by a pin 32 which passes through the ferrule or nipple and the eye.

When the gauge is being used as an inside caliper the nut 24 can be turned to face in the reverse direction from that seen in Figure 2ª and can be used as a check nut if desired for the position of the thread within the sleeve.

In Figure 5 the supplemental fingers 33 can be applied at the ends of the existing fingers in position to give greater spread than that of the knees 34 upon the original fingers. In this form either the original terminals 35 or the final terminals 36 can be used for outside calipering.

In operation the rod 14 can be turned approximately to final adjusted position and the final adjustment can be made close to the point of insertion within the opening whose diameter is being measured. The final diametral measurement can then be taken, adjusting the spread of the feeler finger within the work.

A different type of supplemental feeler fingers, 35' is shown in Figure 6.

One way of using the instrument is to make the spread of the feeler fingers small enough so that there can be no doubt of proper room for insertion within the inside diameter to be measured. With the feeler fingers inside the opening to be measured the thread is turned within the sleeve to allow the feeler fingers progressively to expand until the spacing of the fingers is that corresponding with the gauge measurement sought.

When being used as a depth gauge a somewhat similar situation is present, namely that the rearwardly projecting thread may be rested on a flange or bottom corresponding with the surface whose depth below a flange is to be noted. The depth gauge nut is then run down until it engages the said flange. The rod extension represents the measurement.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my invention.

Having thus described my invention, what I claim as new and desire to secure by Letters Patent is:

1. In an inside caliper, a sleeve, a nut fixed within the rear of the sleeve, a threaded rod within the sleeve and passing through the nut, and diverging spring fingers swivelled to the end of the rod farther from the nut and projecting from the front of the sleeve.

2. A pair of inside calipers comprising a continuous spring member having calipering ends, bent to diverge from the middle toward the ends, a sleeve, at its front end surrounding the middle of the continuous spring and within which the middle of the spring is pulled or from which it is pushed, a threaded rod swivelled to the middle of the continuous spring, and a nut rigid with the sleeve and within which nut the rod is turned to advance or retract the continuous spring.

3. In an inside caliper, a sleeve, a nut secured in one end of the sleeve, a threaded rod operating in the nut and extending through it nearly to the other end of the sleeve, a collar swivelled to the rod and spring arms tending to expand against the inside of the open end of the sleeve and mounted in the collar.

SAMUEL M. KASS.